United States Patent

Sasano et al.

[11] Patent Number: 5,558,508
[45] Date of Patent: Sep. 24, 1996

[54] REED-TYPE DISCHARGE VALVE ARRANGEMENT FOR A HERMETIC COMPRESSOR

[75] Inventors: Hiroshi Sasano; Koshi Hamada; Akihiko Kubota, all of Fujisawa, Japan

[73] Assignee: Matsushita Refrigeration Company, Osaka, Japan

[21] Appl. No.: 137,205

[22] PCT Filed: Mar. 3, 1992

[86] PCT No.: PCT/JP92/00248

§ 371 Date: Oct. 26, 1993

§ 102(e) Date: Oct. 26, 1993

[87] PCT Pub. No.: WO93/18304

PCT Pub. Date: Sep. 16, 1993

[51] Int. Cl.[6] .................................................. F04B 53/10
[52] U.S. Cl. ........................ 417/569; 417/571; 137/856; 137/857
[58] Field of Search ............................ 417/569, 571, 417/415, 902; 137/856, 857

[56] References Cited

U.S. PATENT DOCUMENTS

| 4,628,963 | 12/1986 | Ishijima et al. | 137/857 |
| 4,723,896 | 2/1988 | Fritchman . | |
| 5,110,272 | 5/1992 | Peruzzi et al. | 137/857 |
| 5,209,260 | 5/1993 | Baek | 137/857 |

FOREIGN PATENT DOCUMENTS

| 2655135A1 | 5/1991 | France . | |
| 55-28913 | 10/1980 | Japan . | |
| 63-309787 | 12/1988 | Japan . | |
| 378581 | 4/1991 | Japan . | |
| 3260383 | 11/1991 | Japan | 417/571 |
| 2163236 | 2/1986 | United Kingdom . | |
| 2239691 | 10/1991 | United Kingdom . | |

Primary Examiner—Richard A. Bertsch
Assistant Examiner—Roland G. McAndrews, Jr.
Attorney, Agent, or Firm—Watson Cole Stevens Davis, P.L.L.C.

[57] ABSTRACT

An elongated recess is provided on one side of a valve plate, and a piston is provided on the other side of the valve plate. Discharge holes are provided through the valve plate at the recess, and a pair of discharge reeds are disposed within the recess to close/open the discharge holes. A spring reed presses against the discharge reeds on sides thereof opposite to the discharge holes to close the discharge holes. A stopper is secured to the valve plate and fixes the spring reed into position. The operation of the discharge reed can be tested by the operation of the discharge reed alone, and refrigerant gas remaining in the discharge holes can be reduced, thereby improving compression efficiency. The two discharge holes are each associated with one of the pair of discharge reeds, thereby preventing over-compression loss.

7 Claims, 3 Drawing Sheets

REED-TYPE DISCHARGE VALVE ARRANGEMENT FOR A HERMETIC COMPRESSOR

TECHNICAL FIELD

The present invention relates to a hermetic compressor in which two discharge holes are formed and discharge reeds are placed therein.

BACKGROUND ART

Presently, there are great demands for, the improvement of the compression efficiency of a reciprocating-type hermetic compressor used for a cooling system, such as a refrigerator or a freezer.

A conventional hermetic compressor of this type is disclosed in U.S. Pat. No. 4,723,896, and constructed as follows. The volume of a discharge hole arranged on a valve plate is made small so as to improve compression efficiency. Also, a reed valve is positioned on the discharge hole of the valve plate, and a supporting spring, a valve stopper and a retaining spring are arranged on the reed valve, thus temporarily retaining these members. When a cylinder head is secured to a cylinder block, the retaining spring is pressed so as to secure the cylinder head and the cylinder block.

However, such a conventional hermetic compressor has a problem in that testing of correct positioning of the reed valve for closing the discharge hole and the spring reed for urging the reed valve in the closing direction so as to yield proper operation cannot be performed using only these two members.

Also, in a machine having a greater cylinder volume, having only a single discharge hole might increase the over-compression loss, thus causing a reduction in the compression efficiency. The over-compression loss is caused by the following phenomenon. When the pressure within a cylinder reaches a high level, and such a high pressure slightly exceeds the opening pressure of a discharge reed valve, the discharge reed valve is opened. The small difference between the high pressure and the opening pressure of the discharge reed valve causes the over-compression loss.

DISCLOSURE OF INVENTION

Accordingly, an object of the present invention is to form a recess in a valve plate and to form two discharge holes in the recess which comprises a reed valve for closing the respective discharge holes independently, a spring reed for urging the reed valve in the closing direction and a stopper for pressing the spring reed and the reed valve, thus securing the stopper to the valve plate.

BEST MODE FOR CARRYING OUT THE INVENTION

Figure 1:
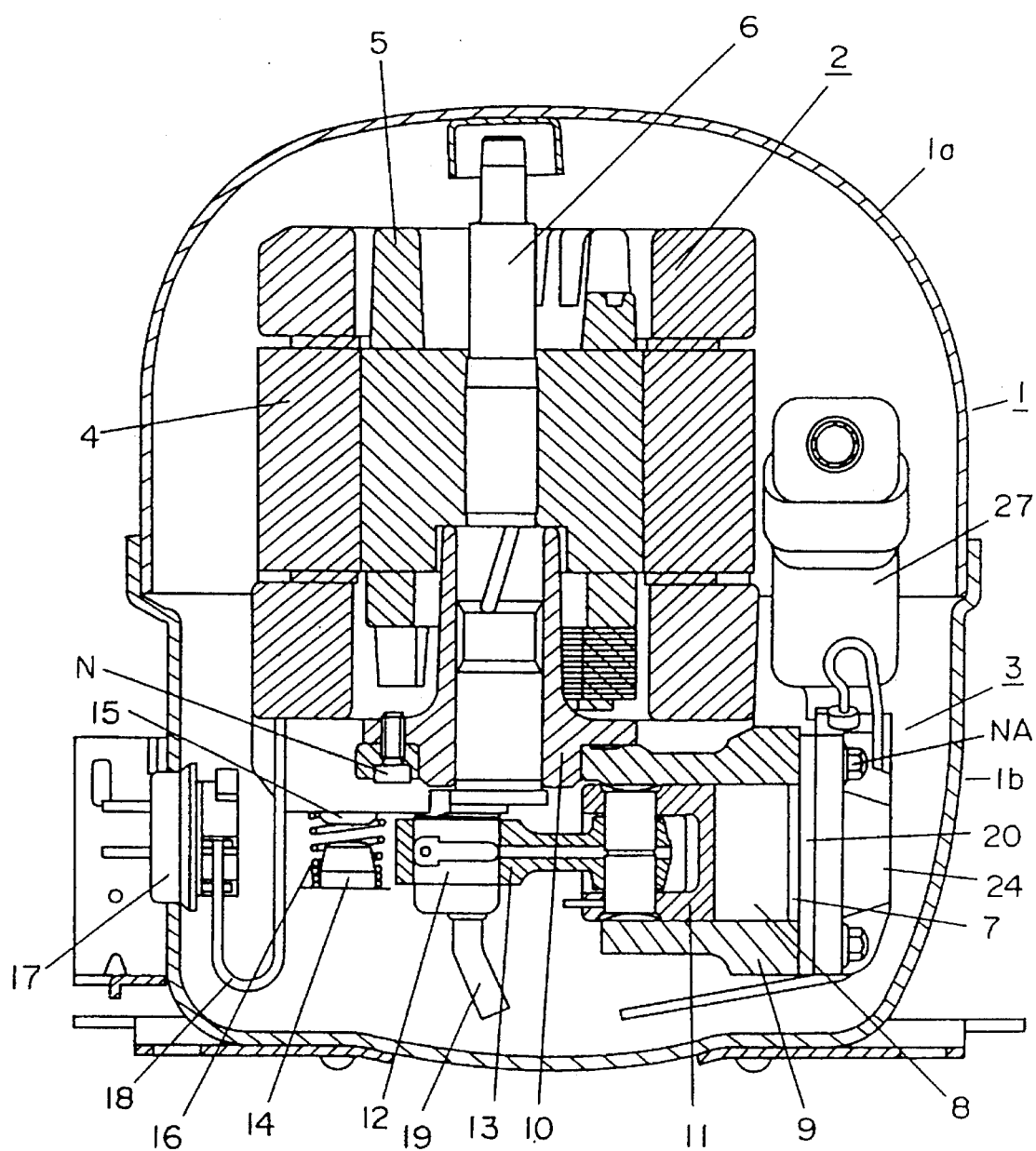
FIG. 1 is a sectional view of a hermetic compressor according to the present invention.

A detailed description of the present invention will be described herein with reference to the drawings.

Reference numeral 1 indicates a hermetic case obtained by fitting an upper case 1a into the periphery of a lower case 1b and by welding the connecting portion therebetween. A motor unit 2 providing a driving source and a compressor unit 3 compressing a refrigerant gas are elastically supported within the hermetic case 1.

The motor unit 2 comprises a stator 4, a rotor 5 and a crank shaft 6 into which the rotor 5 is fitted.

The compressor unit 3 is placed below the motor unit 2 and secures a cylinder block 9 having a cylinder 8 with an opening 7 and a supporting member 10 for supporting the crank shaft 6 of the motor unit 2 via a screw N. A piston 11 and a crank portion 12 of the crank shaft 6 are interconnected via a connecting rod 13 in order to reciprocate the piston 11 accommodated within the cylinder 8.

An oil feeding tube 19 fitted at the bottom of the crank shaft 6 feeds lubricating oil pooled at the bottom of the lower case 1b to a machine by the rotation of the crank shaft 6.

A supporting pin 14 secured on the lower case 1b of the hermetic case 1 and a securing pin 15 elastically support the cylinder block 9 of the compressor unit 3 by way of a compressor spring 16.

A power-supply terminal 17 arranged on the lower case 1b is connected by the stator 4 of the motor unit 2 and a lead line 18.

Figure 2:
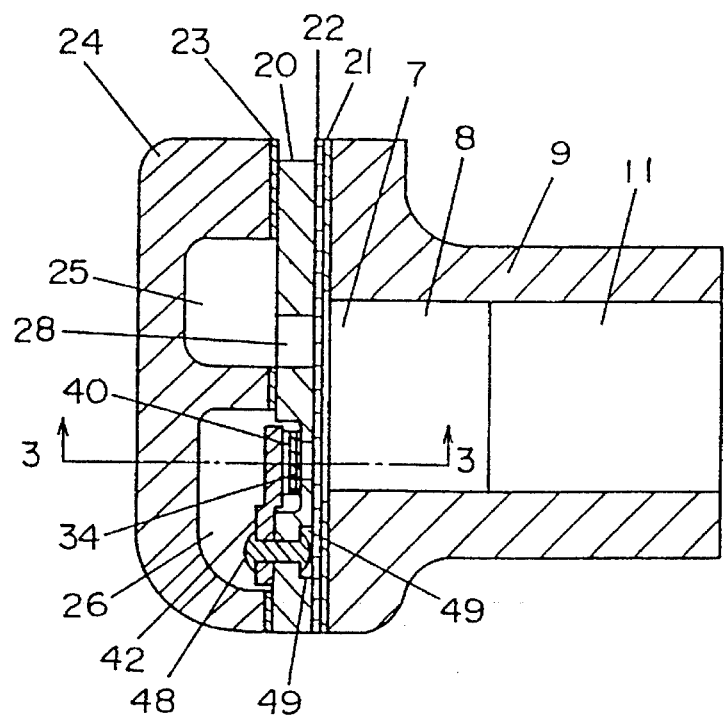
FIG. 2 is a longitudinal sectional view of a compressor unit shown in FIG. 1.

A valve plate 20 closes the opening 7 provided for the cylinder 8 of the cylinder block 9. As shown in FIG. 2, valve plate 20 places a plate gasket 21 and a suction reed 22 adjacent to the opening 7 and a head gasket 23 and a cylinder head 24 away from the opening 7, and secures the four corners via screws NA.

A suction plenum 25 and a discharge plenum 26 are formed on the cylinder head 24 adjacent to the valve plate 20. A suction muffler 27 formed of a synthetic resin is interconnected to the suction plenum 25. The suction muffler 27 is connected to the suction portion of the cooling system outside of the hermetic case 1.

A suction hole 28 passing into the cylinder 8 is formed on the valve plate 20 facing opposite to the suction plenum 25. Two discharge holes 29 passing into the cylinder 8 are also formed on the valve plate 20 facing opposite to the discharge plenum 26.

The suction reed 22 is formed of a flat plate and constructed such that the periphery thereof is removed so as to leave a suction valve portion 30, and holes 31 for receiving the screws NA are formed at four corners.

Also, an elongated recess 32 is formed on the valve plate 20 on the side away from the piston 11. The discharge holes 29 are placed on the recess 32. Ring-shaped discharge valve seats 33 arranged on the discharge holes adjacent to the recess 32 are finished coaxially. The height of the discharge valve seats 33 is made shorter than the depth of the recess 32.

Discharge reeds 34 each have a seal 35 covering the periphery of the discharge valve seat 33 at one end and an ear 36 at the other end. Within the recess 32, a pair of banks 38 extending inward adjacent to ends 37 are each formed between the discharge hole 29 and the end 37 of the recess 32. The ears 36 of the discharge reeds 34 are each placed in the space formed by the bank 38 and the end 37. The discharge reeds 34 are formed symmetrically vertically well as horizontally, so that either of the obverse or reverse sides of the discharge reeds can be accommodated in the recess 32. Steps 39, the height of which is substantially equivalent to that of the discharge valve seats 33, are formed on the portions of the recess 32 abutting against the ears 36. The discharge reeds 34 each abut against the step 39 and the discharge valve seat.

A spring reed 40 formed of a spring material bends both ends 41 and is made shorter than the longitudinal distance between both ends of the elongated recess 32. The spring reed 40 is placed in the recess 32 accommodating the discharge reeds 34, and the top ends 41 of the spring reed 40 are brought into contact with the ends of the discharge reeds 34.

Figure 3:
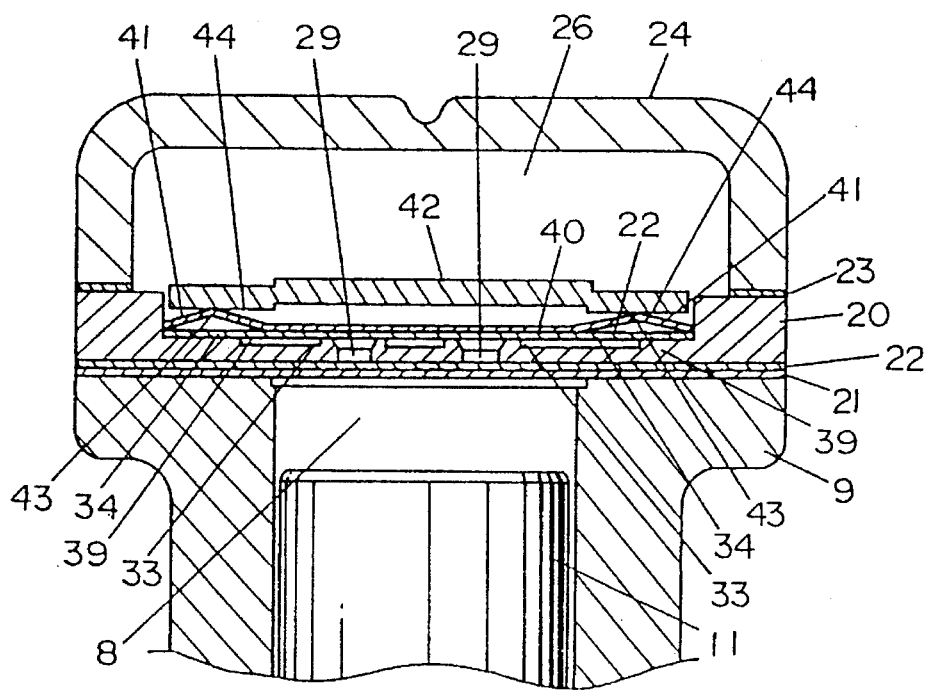
FIG. 3 is a sectional view taken on line 3—3 of FIG. 2.
Figure 4:
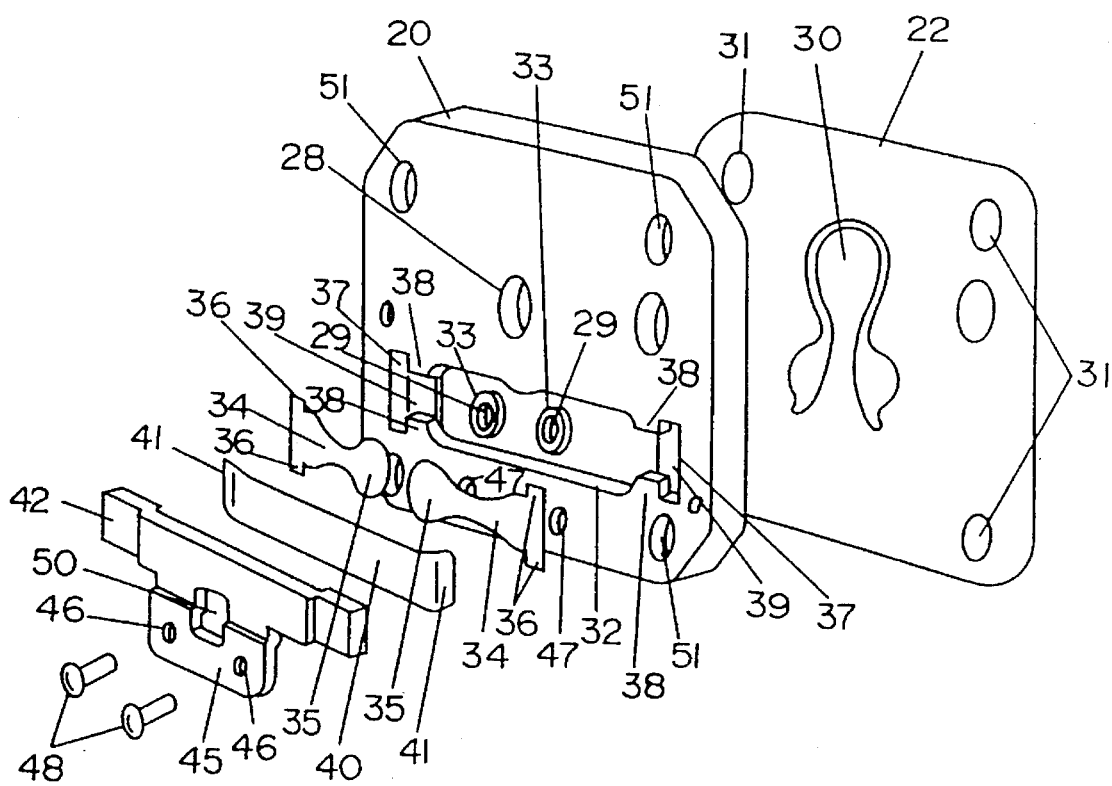
FIG. 4 is an exploded perspective view of a valve plate according to the present invention.

A stopper 42 has surfaces 44 for pressing bends 43 of the spring reed 40 and a fixing portion 45 for fixing to the valve plate 20. A portion of the surfaces 44 are inserted into the recess 32. The fixing portion 45 includes two holes 46 which match holes 47 of the valve plate 20, thereby securing the fixing portion 45 and the valve plate 20 via rivets 48. A spot facing 49 is arranged on the valve plate 20 on the side opposite to the recess 32 receiving the rivets 48, thereby preventing the rivets 48 from projecting. When the stopper 42 is secured to the valve plate 20, the spring reed 40 deforms so as to press the discharge reeds 34 to the discharge valve seats 33 substantially at the central portion, as shown in FIG. 3. Such pressing determines the opening pressure of the discharge holes 29 by the discharge reeds 34. When the spring reed 40 presses the discharge reeds 34 to the discharge valve seats 33, small spaces are produced between either end of the spring reed 40 and either end 37 of the recess 32.

A hole 50 of the stopper 42 is arranged to be overlapped with the recess 32 and to direct the discharge gas easily into the discharge plenum 26.

The head gasket 23 intervenes between the abutting surfaces of the valve plate 20 and the cylinder head 24.

Holes 51 for receiving the screws NA are formed at four corners of the valve plate 20.

In the compressor constructed above, a refrigerant gas returned from the cooling system is fed to the suction plenum 25 of the cylinder head 224 via the suction muffler 27. In accordance with the operation of the piston 11, the refrigerant gas is sucked into the cylinder 8 from the suction hole 28 of the valve plate 20 by the opening of the suction valve 30. As the piston 11 approaches the valve plate 20, the compressed refrigerant gas passes through the discharge holes 29 of the valve plate 20 and pushes away the discharge reeds 34 and the spring reed 40 so as to be discharged into the discharge plenum 26 of the cylinder head 24 and fed to the cooling system via a communicating tube (not shown).

As stated above, the discharge reeds 34, the spring reed 40 and the stopper 42 are fixed to the valve plate 20, and the operation of the discharge reeds 34 can be confirmed, thus maintaining a predetermined operation of the compressor.

Figure 5:
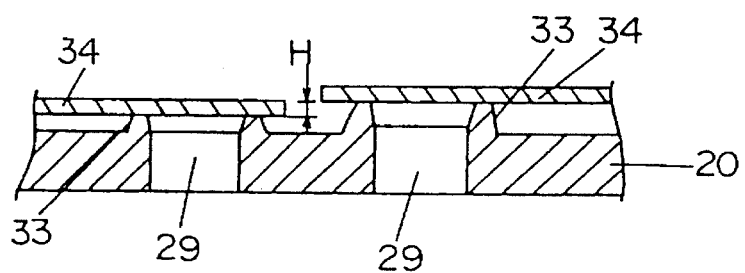
FIG. 5 is a sectional view showing a discharge reed of the present invention, which is closed.

The discharge holes 29 are disposed on the recess 32 of the valve plate 20, thereby enabling them to have a the shorter here than the thickness of the valve plate 20. Thus, the refrigerant gas remaining in these spaces can be reduced, and accordingly, the compression efficiency can be improved. Also, since plural discharge holes 29 are provided, an increase in the over-compression loss can be avoided. Further, the discharge holes 29 are each provided with the discharge reed 34. Consequently, even though the difference in level H shown in FIG. 5 is produced in forming the respective discharge valve seats 33, the different level H can be reliably sealed. In particular, a plurality of discharge valve seats 33 are formed within the recess 32 arranged on the valve plate 20 such as to have flat surfaces, thus ensuring surfaces for sealing the discharge reeds 34, and simplifying the process of producing flat surfaces. Since the discharge reeds 34 are vertically symmetrical, free from orientation, it is not necessary to further produce special parts for automatic assembly, thus enabling simplifying the assembly.

INDUSTRIAL APPLICABILITY

As described above, the hermetic compressor according to the present invention is applicable to a refrigerant compressor of a cooling system such as a refrigerator, a freezer, or the like.

We claim:

1. A hermetic compressor comprising:

a hermetic case;

a cylinder block fitted within said case, said cylinder block including a cylinder having an open end;

a piston disposed within said cylinder;

a motor fitted on said cylinder block for reciprocating said piston within said cylinder;

a valve plate secured to said cylinder block at said open end;

an elongated recess formed on a surface of said valve plate opposite to a side of said valve plate on which said piston is disposed;

a pair of discharge holes provided through said valve plate, said discharge holes having an end portion opening to an inside region of said recess;

a pair of discharge reeds disposed within said recess for sealing said discharge holes;

a spring reed for pressing against a first side of said discharge reeds, said discharge reeds having a second side which is opposite to said first side, said discharge holes being located adjacent to said second side;

a stopper secured to said valve plate which fixes a position of said spring reed; and a cylinder head including a discharge plenum covering said stopper, said spring reed, said discharge reeds and said recess;

said discharge holes each including a discharge valve seat on said end portion opening to said inside region of said recess, wherein:

said valve plate has a pair of steps formed on respective ends of said recess such that said discharge holes are interposed between said pair of steps, and said discharge reeds abut against respective ones of said discharge valve seats and said steps to seal said discharge holes.

2. A hermetic compressor according to claim 1, wherein said pair of discharge reeds are separate elements not connected to each other and able to move independently of one another in a direction substantially along respective longitudinal axes of said discharge holes.

3. A hermetic compressor according to claim 1, wherein said discharge valve seat of each of said discharge holes has a height extending into said region which is less than a depth of said recess and said steps have a height substantially and in a same direction as that of said discharge valve seat.

4. A hermetic compressor according to claim 1, wherein said cylinder block is elastically fitted within said case and said discharge valve seat of each of said discharge holes is ring-shaped.

5. A hermetic compressor according to claim 1, wherein:

said valve plate includes a pair of banks for positioning said pair of discharge reeds, said banks being respectively disposed between one of said discharge holes and one of said respective ends of said recess of said valve plate relative to a longitudinal dimension of said elongated recess and adjacent to said one of said respective ends, and said discharge reeds each include an ear portion accommodated between one of said banks and one of said respective ends of said recess, said banks functioning to block movement of said ear portion of each of said discharge reeds along said longitudinal dimension of said recess.

6. A hermetic compressor according to claim 5, wherein:

said spring reed is formed of a spring material having bent ends, a distance between said bent ends of said spring reed being shorter than a longitudinal distance between said ends of said recess, and end portions of said bent ends of said spring reed abut against said ear portion of each of said discharge reeds between respective ones of said ends of said recess and respective ones of said banks, thereby pressing said spring reed toward the inside region of said recess by said stopper.

7. A hermetic compressor according to claim 6, wherein said spring reed presses against said discharge reeds at a portion of said recess at which said discharge holes are located.

* * * * *